United States Patent [19]

Lohmeyer

[11] 4,150,854

[45] Apr. 24, 1979

[54] WIRE WHEEL SEALING SYSTEM

[75] Inventor: Kurt W. Lohmeyer, Fullerton, Calif.

[73] Assignee: Tru-Spoke, Inc., Anaheim, Calif.

[21] Appl. No.: 795,287

[22] Filed: May 9, 1977

[51] Int. Cl.² .................. B60B 21/06; B60B 21/12
[52] U.S. Cl. ........................ 301/58; 301/97;
152/366
[58] Field of Search ............... 301/55, 58, 97;
152/330 R, 365, 366; 428/355

[56] References Cited

U.S. PATENT DOCUMENTS

| 2,119,508 | 6/1938 | Barnhart | 260/28.5 C X |
|---|---|---|---|
| 2,608,543 | 8/1952 | Wiswell | 428/355 X |
| 2,613,156 | 10/1952 | McGaffin et al. | 260/28.5 C |
| 3,008,770 | 11/1961 | Mueller | 301/97 |
| 3,286,757 | 11/1966 | Thomas | 152/330 R |
| 3,926,878 | 12/1975 | Shimizu et al. | 260/28.5 C X |
| 3,993,357 | 11/1976 | Reppert | 301/58 |

Primary Examiner—Robert J. Spar
Assistant Examiner—Charles A. Marmor
Attorney, Agent, or Firm—Gerald L. Price

[57] ABSTRACT

A one-step wire-wheel sealing system for pneumatic spoke wheels is disclosed in which a hot-melt adhesive is applied in molten form to the dropped spoke well of a metal wheel rim and is then cooled in place to form an adherent, resilient annular ring which prevents rotation of the spoke fasteners and leakage of inflation gas between the spoke ends and the spoke holes in the rim.

4 Claims, 3 Drawing Figures

WIRE WHEEL SEALING SYSTEM

BACKGROUND OF THE INVENTION

1. Field of the Invention

The present invention relates to a sealing system for laced wire wheels.

2. Description of the Prior Art

A recent trend in vehicle purchases is for custom wheels such as alloy or spoke rims for automobiles, pickups, vans, recreation vehicles and trailers. However, most users prefer tubeless or pneumatic tires for safety, convenience and cost. Cast alloy rims are readily adaptable for use with tubeless tires. Spoke rims are returning to fashion for classic, antique and custom vehicles. There are many simulated spoke rims. However, they do not have the attractive appearance of laced wire wheels.

Laced wire wheels have numerous apertures in the well of the rim for receiving the spokes and spoke fasteners. It is difficult to seal these apertures since the spokes continuously receive stress during travel of the vehicle and tend to break away from sealant or if the sealant is too brittle will cause chipping or cracking of the seal and loss of pneumatic pressure. The annular seal may also separate from the wall of the well. There have been prior systems for sealing spoke rims. In U.S. Pat. No. 3,008,770 a dual metal rim is employed to provide a spoked wheel suitable for tubeless bicycle tires. In U.S. Pat. No. 3,335,778 a rubber sealing flap is employed to seal a wire rim. A two part curing polyurethane is sprayed onto the inner portion of the rim in U.S. Pat. No. 3,286,757. A preliminary adhesive or primer coat is required to provide adequate adhesion. These systems are unduly complex and costly or do not provide an adequate, reliable seal under road conditions.

SUMMARY OF THE INVENTION

An improved one-step sealing system for pneumatic wire wheels is provided in accordance with the invention. The sealing system provides an in-situ annular sealing member that is reliably adhered to the rim and spoke fastener surfaces. The sealing member is resilient and capable of absorbing tensile, torsion and impact stresses without separating cracking or otherwise causing loss of pneumatic seal.

The sealing member is formed of a thermoplastic hot-melt adhesive containing a plasticizer to increase elastomeric properties. The adhesive is heated to a temperature at which it flows and is applied to the spoke well in the rim in an amount sufficient to cover the spoke fasteners. After cooling, a continuous sealing member is formed and the rim is ready for service as a pneumatic tubeless tire rim. The rim can also be utilized with tube tires since the sealing member will prevent rupture of the tube as it expands against the interior surface of the rim.

These and many other objects and attendant advantages of the invention will become apparent as the invention becomes better understood by reference to the following detailed description when considered in conjunction with the accompanying drawings.

DESCRIPTION OF THE PREFERRED EMBODIMENTS

Figure 1:
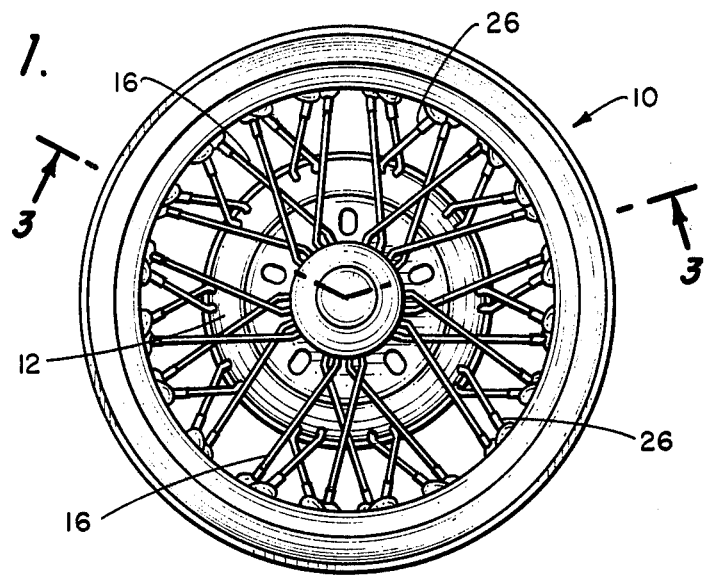
FIG. 1 is a front elevational view of a pneumatic tubeless tire and spoke wheel assembly of the invention.
Figure 2:
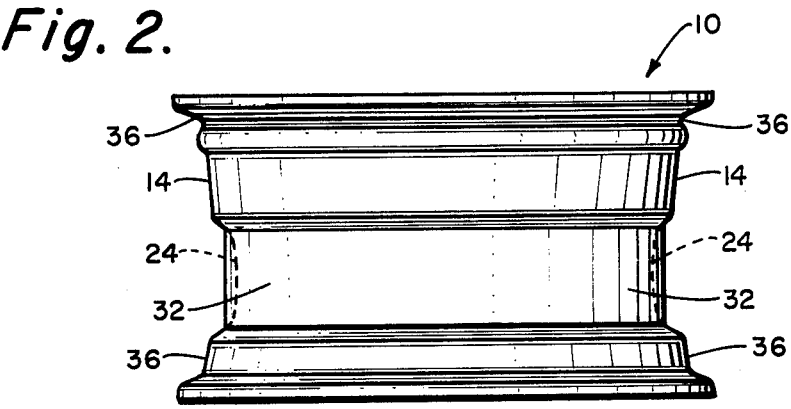
FIG. 2 is a side elevational view of the spoke wheel assembly.
Figure 3:
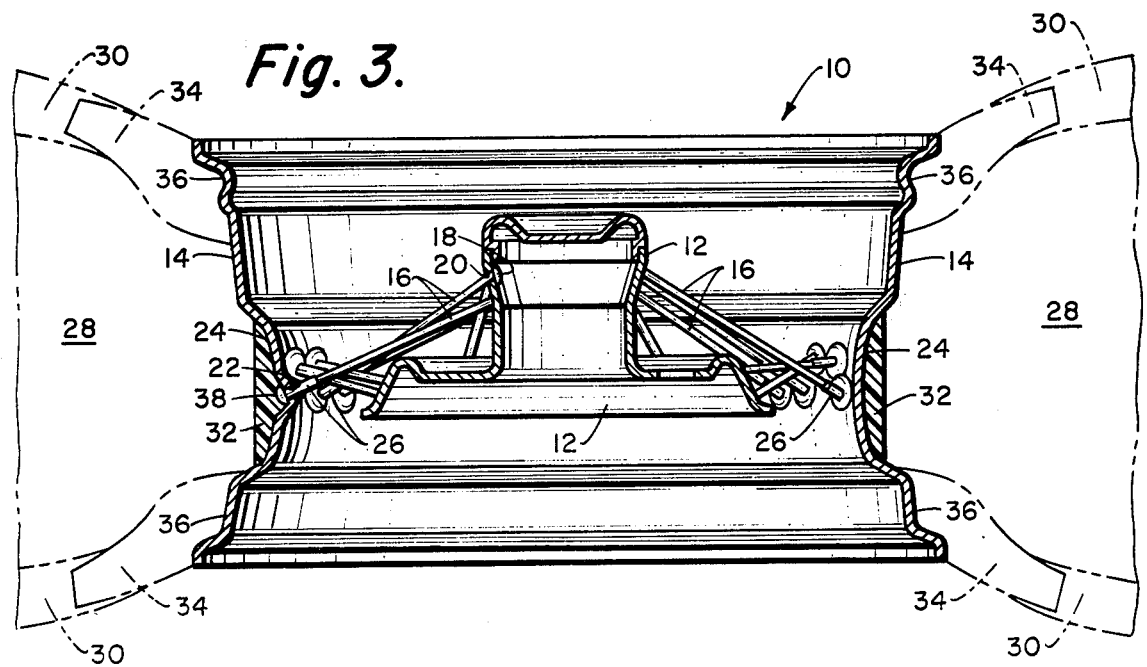
FIG. 3 is a section taken along line 3—3 of FIG. 1.

Referring now to FIGS. 1-3 the pneumatic wire wheel 10 of the invention generally includes a hub portion 12 connected to a drop center rim 14 by means of spokes 16. These spokes 16 generally contain a bolt member 18 extending through apertures 20 in the hub and a bolt or nut fastener 38 extending through apertures 22 in the drop center portion 24 of the rim 14. Tension on the spokes can be varied by rotation of the adjusters 26. An air chamber 28 is formed between the rim and a pneumatic tire 30 which includes a bead portion 34 which seats into the shoulder portion 36 of the rim 14. The sealing member 32 forms a continuous annular ring and is of a thickness sufficient to completely encapsulate the nut fasteners 38 on the ends of the spoke 16.

Sealing member 32 may be applied by brushing, spraying or any other suitable means, but is preferably applied by a blade applicator. The hot melt adhesive is heated to melting temperatures suitably above about 175° F. in a separate vessel. The rim is placed on a rotatable mount and is rotated by hand or by power drive while the operator applies molten adhesive to the drop center portion of the rim to completely cover the well from side to side and in a thickness sufficient to encapsulate the fasteners. The hot melt adhesive is typically applied in a thickness of at least ¼ inch suitably about ½ inch to the well. The rim is then removed from the rotating fixture and the adhesive is allowed to cool to room temperature and it hardens to form a continuous resilient sealant band. The rim is now ready for application of a pneumatic tubeless tire.

The hot melt adhesive should have a melting temperature at least 20° F. above the temperatures experienced during road travel. It is known that tires develop considerable heat from hysteresis during travel. On a hot day a vehicle traveling at highway speeds, the tires may be heated to a temperature considerably above 120° F. Therefore the melting temperature of the adhesive should be above 140° F. The hot melt adhesive should show good adhesion to the polished metal surfaces of the well but yet have sufficient modulus to hold the fasteners in position without rotation and yet be resilient enough to absorb stress transmitted by the spokes to the sealing member through the fastener without causing chipping, cracking or delamination of the sealing member from the inner surface of the well of the rim.

The hot melt adhesive contains at least 50%, suitably 60 to 70% by weight of a synthetic hydrocarbon resin such as polystyrene and at least 25% by weight of a compatible soluble plasticizer suitably an ester of phthalic acid and an alcohol containing 1 to 10 carbon atoms such as diethyl phthalate. The hot melt adhesive may also contain from 0 to 4% by weight of an inorganic, particulate filler such as calcium carbonate and from 2 to 5% by weight of a resin to promote adhesion such as a coumarone-indene resin. A supplementary adhesion resin becomes more necessary when the sealing member is to be applied to a smooth chromed surface.

An example of practice follows:

EXAMPLE

A rim was laced to a hub with spokes as shown in the figure. The laced assembly was trued and then chrome plated electrolytically to plate all surfaces of the rim-hub-spoke assembly. The assembly was then placed on a rotating fixture and a molten hot melt adhesive was applied to the well by means of a blade applicator as follows:

| Material | Amount |
|---|---|
| Polystyrene | 66% |
| Diethyl phthalate | 32% |
| Calcium Carbonate | 1.5% |
| Coumarone-indene resin | 0.5% |

The thickness of the sealant layer was about ½ inch. The rim was then removed from the fixture and allowed to cool to room temperature and a pneumatic tire applied and inflated and there was no evidence of leakage of inflation gas even when tested under rough road conditions.

It is to be realized that only preferred embodiments of the invention have been described and that numerous substitutions, alterations and modifications are permissable without departing from the spirit and scope of the invention as defined in the following claims.

What is claimed is:

1. A spoke wheel assembly comprising a pneumatic wheel including a plurality of spokes, a hub and a rim having a recessed annular drop-center portion, and generally rotatable retaining means joining the ends of the spokes to the hub and the drop-center portion of the rim, a continuous annular sealing member adherently received in said drop-center rim portion engaging the retaining means in generally non-rotatable securement formed of an in situ cured single system non-aqueous hot-melt thermoplastic composition comprising as essential components by weight about:

| 50 to 70% | polystyrene |
|---|---|
| 25 to 32% | ester of phthalic acid and a 1 to 10 carbon alcohol |
| 0 to 4% | calcium carbonate |
| 0.5 to 5% | coumarone-indene resin; | and having a melting point above about 140° F. and maintaining in use gas leakage prevention sealing adhesion to said rim and having a sufficient modulus to hold said spoke retaining means in generally non-rotatable position while being sufficiently resilient to absorb stress without delamination from the inner surface of the drop-center portion of the rim.

2. An assembly according to claim 1 in which the plasticizer is diethyl phthalate.

3. An assembly according to claim 1 in which the surface of the drop-center portion and of the retaining means are chrome-plated.

4. An assembly according to claim 1 in which the sealing member is about one-half inch thick.

* * * * *